(12) United States Patent
Hua et al.

(10) Patent No.: US 12,495,415 B2
(45) Date of Patent: Dec. 9, 2025

(54) UPLINK TRANSMISSION METHOD AND APPARATUS

(71) Applicant: HUAWEI TECHNOLOGIES CO., LTD., Shenzhen (CN)

(72) Inventors: Meng Hua, Shanghai (CN); Zhiheng Guo, Beijing (CN); Feng Yuan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 378 days.

(21) Appl. No.: 17/985,934

(22) Filed: Nov. 14, 2022

(65) Prior Publication Data

US 2023/0071651 A1 Mar. 9, 2023

Related U.S. Application Data

(63) Continuation of application No. PCT/CN2020/090181, filed on May 14, 2020.

(51) Int. Cl.
*H04W 72/1268* (2023.01)
*H04L 25/02* (2006.01)
*H04W 72/23* (2023.01)

(52) U.S. Cl.
CPC ....... *H04W 72/1268* (2013.01); *H04W 72/23* (2023.01); *H04L 25/0224* (2013.01)

(58) Field of Classification Search
CPC .............. H04W 72/1268; H04W 72/23; H04L 25/0024; H04L 25/0202
See application file for complete search history.

(56) References Cited

U.S. PATENT DOCUMENTS

| | | | |
|---|---|---|---|
| 2019/0349148 A1 | 11/2019 | Nammi | |
| 2020/0068563 A1* | 2/2020 | Wu | H04L 5/0005 |
| 2021/0014095 A1* | 1/2021 | Ly | H04W 72/23 |

FOREIGN PATENT DOCUMENTS

| | | | | |
|---|---|---|---|---|
| CN | 107926023 A | | 4/2018 | |
| CN | 108809545 B1 | * | 11/2018 | ............ H04W 72/02 |
| CN | 108809545 B2 | * | 11/2018 | ............ H04W 72/02 |
| CN | 109802801 A | | 5/2019 | |

(Continued)

OTHER PUBLICATIONS

Chinese Office Action issued in corresponding Chinese Application No. 202080095011.6, dated May 29, 2024, pp. 1-5.

(Continued)

*Primary Examiner* — Kent Krueger
(74) *Attorney, Agent, or Firm* — HAUPTMAN HAM, LLP

(57) ABSTRACT

An uplink transmission method includes receiving a first message that is used to configure a first uplink resource. The method also includes performing uplink transmission on the first uplink resource. The first uplink resource includes at least a first part and a second part in a first time period, a phase deviation of uplink transmission between the first part and the second part falls within a first threshold range, or a power deviation of uplink transmission between the first part and the second part falls within a second threshold range. The first time period is a duration between a start time and an end time of the first uplink resource in a first time length, or a duration between a start time and an end time of the first uplink resource in a first transmit opportunity.

22 Claims, 9 Drawing Sheets

(56) References Cited

FOREIGN PATENT DOCUMENTS

| CN | 110536438 A | 12/2019 |
|---|---|---|
| JP | 2008061190 A | 3/2008 |

OTHER PUBLICATIONS

Huawei, HiSilicon, discussion on RF time mask for Rel-16[online], 3GPP TSG RAN WG4 #90 R4-1901824,2019.02.15.
Huawei, HiSilicon, On power transition mask in NR[online], 3GPP TSG RAN WG4 #87 R4-1807414,2018.05.14.
Japanese Office Action issued in corresponding Japanese Application No. 2022-568993, dated Oct. 31, 2023, pp. 1-4.
European Office Action issued in EP20936067.6 dated Sep. 9, 2025.

\* cited by examiner

UPLINK TRANSMISSION METHOD AND APPARATUS

CROSS-REFERENCE TO RELATED APPLICATIONS

This application is a continuation of International Application No. PCT/CN2020/090181, filed on May 14, 2020, the disclosure of which is hereby incorporated by reference in its entirety.

TECHNICAL FIELD

This application relates to communication technologies, and in particular, to an uplink transmission method and apparatus.

BACKGROUND

In new radio (NR), a high frequency band is usually used for communication, and data transmission with a high rate and a low latency can be provided, to meet a use requirement of a user.

If a high frequency band is used, uplink coverage is limited. To resolve a problem of limited uplink coverage, quality of channel estimation is improved, and the uplink coverage is enhanced. Generally, a manner of increasing density of reference signals (RS) is used to improve the quality of channel estimation. For example, in NR, in addition to a basic demodulation reference signal (DMRS), an additional DMRS is further configured.

However, in the foregoing manner, DMRS resource overheads are increased, and uplink spectrum utilization is affected.

SUMMARY

Embodiments of this application provide an uplink transmission method and apparatus, to improve channel estimation quality without adding an additional DMRS, so that DMRS resource overheads are reduced, and uplink spectrum utilization is improved.

According to a first aspect, an embodiment of this application provides an uplink transmission method. The method may include: receiving a first message sent by an access network device, where the first message is used to configure a first uplink resource; and performing uplink transmission on the first uplink resource.

The first uplink resource includes at least a first part and a second part in a first time period. A phase deviation of uplink transmission between the first part and the second part falls within a first threshold range, and/or a power deviation of uplink transmission between the first part and the second part falls within a second threshold range. The first time period is duration between a start time and an end time of the first uplink resource in a first time length, or the first time period is duration between a start time and an end time of the first uplink resource in a first transmit opportunity. The first part and the second part meet at least one of the following: a time domain interval between the first part and the second part is greater than 0 time domain resource units, or the first part and the second part are located in different slots.

In this implementation, the phase deviation of uplink transmission between the first part and the second part is controlled to fall within the first threshold range, and/or the power deviation of uplink transmission between the first part and the second part is controlled to fall within the second threshold range. In this way, the access network device can perform filtering for a long time in the first time period, to improve channel estimation quality and enhance uplink coverage. In this method, no additional DMRS needs to be added, so that DMRS resource overheads are reduced, and uplink spectrum utilization is improved.

In a possible implementation, the first threshold range is determined based on the time domain interval between the first part and the second part, and/or the second threshold range is determined based on an interval between slots in which the first part and the second part are located.

In this implementation, the first threshold range is determined based on the time domain interval between the first part and the second part, and then the phase deviation of uplink transmission between the first part and the second part is controlled to fall within the first threshold range based on the first threshold range. In this way, the access network device can perform filtering for a long time in the first time period, to improve channel estimation quality and enhance uplink coverage.

The second threshold range is determined based on the interval between slots in which the first part and the second part are located, and then the power deviation of uplink transmission between the first part and the second part is controlled to fall within the second threshold range based on the second threshold range. In this way, the access network device can perform filtering for a long time in the first time period, to improve channel estimation quality and enhance uplink coverage.

In a possible design, the method may further include: receiving first information sent by the access network device, where the first information indicates the first time length, or the first information indicates a quantity M of first transmit opportunities, and the quantity of first transmit opportunities is used to determine the first transmit opportunity.

In this implementation, the access network device indicates the first time length or the quantity M of first transmit opportunities, so that the access network device controls, based on an indication of the access network device, a phase deviation or a power deviation of uplink transmission between the first part and the second part at a corresponding time domain location. In this way, the access network device can perform filtering for a long time in the first time period, to improve channel estimation quality and enhance uplink coverage.

In a possible design, the method may further include: receiving second information sent by the access network device, where the second information indicates to perform uplink transmission on the first uplink resource.

In this implementation, the access network device indicates a target channel or a target signal, so that the access network device controls, based on an indication of the access network device, a phase and/or power of uplink transmission of the target channel or the target signal. In this way, the access network device can perform filtering for a long time in the first time period, to improve channel estimation quality and enhance uplink coverage.

In a possible design, the first uplink resource includes P transmit opportunities, and the P transmit opportunities are divided into K groups. When P is less than or equal to M, K is 1, and the first transmit opportunity is the P transmit opportunities. When P is greater than M, the first transmit opportunities of first K−1 groups in the K groups include M transmit opportunities, and the first transmit opportunity of a $K^{th}$ group includes P−(K−1)*M transmit opportunities, where $$K = \left\lceil \frac{P}{M} \right\rceil,$$

and ⌈ ⌉ is a rounding up operator.

In this implementation, the first transmit opportunities of the K groups may be determined based on the quantity M of first transmit opportunities and a quantity P of transmit opportunities of the first uplink resource, and the first time period is determined based on the first transmit opportunities of the K groups, to further control a phase and/or power of uplink transmission on the first uplink resource in the first time period. In this way, the access network device can perform filtering for a long time in the first time period, to improve channel estimation quality and enhance uplink coverage.

In a possible design, the method may further include: determining not to receive downlink information in the first time period.

In this implementation, for a time division multiplexing mode, the terminal device may not receive the downlink information in the first time period. In other words, the terminal device ignores the downlink information. The downlink information is not received in the first time period, to avoid a phase jump of uplink transmission caused by uplink-downlink switching, and ensure that phases of uplink transmission on the first uplink resource in the first time period are continuous or phase deviations fall within a specific range. In this way, the access network device can perform filtering in the first time period, to improve channel estimation quality.

In a possible design, the method may further include: receiving a second message sent by the access network device, where the second message is used to configure a second uplink resource, and the second uplink resource is used to send second uplink information; and determining not to send the second uplink information on the second uplink resource in the first time period.

The first uplink resource is used to send first uplink information. The first uplink information and the second uplink information are information about different types of uplink physical layer channels or different types of uplink physical layer signals. Alternatively, one of the first uplink information and the second uplink information is information about an uplink physical layer channel, and the other is an uplink physical layer signal. Alternatively, the first uplink information and the second uplink information belong to different power control processes. Alternatively, the first uplink information and the second uplink information are information about a same type of uplink physical layer channels and correspond to different hybrid automatic repeat request identification numbers.

Different types of uplink physical channels may include, for example, a PUSCH and a PUCCH.

In this implementation, the terminal device may not send uplink information of the second uplink resource in the first time period. Uplink information other than the first uplink information is not sent in the first time period, to avoid phase jumps of uplink transmission on different uplink resources, and ensure that phases of uplink transmission in the first time period are continuous or phase deviations fall within a specific range. In this way, the access network device can perform filtering in the first time period, to improve channel estimation quality.

In a possible design, the second uplink resource is a periodic or semi-persistent uplink resource, and the method may further include: receiving a third message sent by the access network device, where the third message is used to configure a third uplink resource, the third uplink resource is an uplink resource scheduled by using physical layer signaling, and the third uplink resource is used to send third uplink information; and sending the third uplink information on the third uplink resource. A power deviation of uplink transmission on the third uplink resource and the first uplink resource in the first time period falls within the second threshold range, or a phase deviation of uplink transmission falls within the first threshold range.

The first uplink information and the third uplink information are information about different types of uplink physical layer channels or different types of uplink physical layer signals. Alternatively, one of the first uplink information and the third uplink information is information about an uplink physical layer channel, and the other is an uplink physical layer signal. Alternatively, the first uplink information and the third uplink information belong to different power control processes. Alternatively, the first uplink information and the third uplink information are information about a same type of uplink physical layer channels and correspond to different hybrid automatic repeat request identification numbers.

In this implementation, the terminal device does not send uplink information of a periodic or semi-persistent uplink resource in the first time period, but sends uplink information of a dynamically scheduled uplink resource in a power control manner, to ensure that phases of uplink transmission in the first time period are continuous or phase deviations fall within a specific range. In this way, the access network device can perform filtering in the first time period, to improve channel estimation quality.

In a possible design, the method further includes: receiving a second message sent by the access network device, where the second message is used to configure a second uplink resource, and the second uplink resource is used to send second uplink information; and sending the second uplink information on the second uplink resource. A power deviation of uplink transmission on the second uplink resource and the first uplink resource in the first time period falls within the second threshold range, or a phase deviation of uplink transmission falls within the first threshold range.

The first uplink resource is used to send first uplink information. The first uplink information and the second uplink information are information about different types of uplink physical layer channels or different types of uplink physical layer signals. Alternatively, one of the first uplink information and the second uplink information is information about an uplink physical layer channel, and the other is an uplink physical layer signal. Alternatively, the first uplink information and the second uplink information belong to different power control processes. Alternatively, the first uplink information and the second uplink information are information about a same type of uplink physical layer channels and correspond to different hybrid automatic repeat request identification numbers.

In this implementation, the terminal device sends uplink information of all the uplink resources in a power control manner in the first time period, to ensure that phases of uplink transmission in the first time period are continuous or phase deviations fall within a specific range. In this way, the access network device can perform filtering in the first time period, to improve channel estimation quality.

In a possible design, a phase deviation of uplink transmission of the first part falls within a first threshold range, a phase deviation of uplink transmission of the second part falls within the first threshold range, and/or a power deviation of uplink transmission of the first part falls within a second threshold range, and a power deviation of uplink transmission of the second part falls within the second threshold range.

According to a second aspect, an embodiment of this application provides an uplink transmission method. The method may include: sending a first message to a terminal device, where the first message is used to configure a first uplink resource; and performing uplink reception on the first uplink resource.

The first uplink resource includes at least a first part and a second part in a first time period, a phase deviation of uplink transmission between the first part and the second part falls within a first threshold range, and/or a power deviation of uplink transmission between the first part and the second part falls within a second threshold range. The first time period is duration between a start time and an end time of the first uplink resource in a first time length, or is duration between a start time and an end time of the first uplink resource in a first transmit opportunity. The first part and the second part meet at least one of the following: a time domain interval between the first part and the second part is greater than 0 time domain resource units, or the first part and the second part are located in different slots.

In a possible design, the method may further include: sending first information to the terminal device, where the first information indicates the first time length, or the first information indicates a quantity M of first transmit opportunities, and the quantity of first transmit opportunities is used to determine the first transmit opportunity.

In a possible design, the method may further include: sending second information to the terminal device, where the second information indicates to perform uplink transmission on the first uplink resource.

In a possible design, the method may further include: determining not to perform at least one of the following in the first time period: sending a second message to the terminal device, where the second message is used to dynamically schedule a first downlink resource, and the first downlink resource is used to send downlink information; sending downlink information to the terminal device by using a dynamically scheduled first downlink resource; sending downlink information to the terminal device by using a periodic or semi-persistent second downlink resource;

or sending a third message to the terminal device, where the third message is used to dynamically schedule a second uplink resource, and the second uplink resource is used to receive second uplink information.

The first uplink resource is used to receive first uplink information. The first uplink information and the second uplink information are information about different types of uplink physical layer channels or different types of uplink physical layer signals. Alternatively, one of the first uplink information and the second uplink information is information about an uplink physical layer channel, and the other is an uplink physical layer signal. Alternatively, the first uplink information and the second uplink information belong to different power control processes. Alternatively, the first uplink information and the second uplink information are information about a same type of uplink physical layer channels and correspond to different hybrid automatic repeat request identification numbers.

In a possible design, the method further includes at least one of the following: performing channel estimation of the second part based on a pilot signal of the first part; or performing channel estimation of the first part based on a pilot signal of the second part.

According to a third aspect, an embodiment of this application provides a communication apparatus. The communication apparatus is configured to perform the uplink transmission method according to any one of the first aspect or the possible designs of the first aspect. Specifically, the communication apparatus may include a module configured to perform the uplink transmission method according to any one of the first aspect or the possible designs of the first aspect. For example, the communication apparatus may include a transceiver module and a processing module. The communication apparatus may be a terminal device, or may be a chip or a system on chip in a terminal device.

According to a fourth aspect, an embodiment of this application provides a terminal device, where the terminal device includes a memory and a processor, the memory is configured to store instructions, the processor is configured to execute the instructions stored in the memory, and the processor executes the instructions stored in the memory to enable the processor to perform the method according to any one of the first aspect or the possible designs of the first aspect.

According to a fifth aspect, an embodiment of this application provides a computer-readable storage medium, where the computer-readable storage medium stores a computer program, and when the program is executed by a processor, the method according to any one of the first aspect or the possible designs of the first aspect is implemented.

According to a sixth aspect, an embodiment of this application provides a communication apparatus. The communication apparatus is configured to perform the uplink transmission method according to any one of the second aspect or the possible designs of the second aspect. Specifically, the communication apparatus may include a module configured to perform the uplink transmission method according to any one of the second aspect or the possible designs of the second aspect. For example, the communication apparatus may include a transceiver module and a processing module. The communication apparatus may be a network device, for example, an access network device. Alternatively, the communication apparatus may be a chip or a system on chip in an access network device.

According to a seventh aspect, an embodiment of this application provides a network device, where the network device includes a memory and a processor, the memory is configured to store instructions, the processor is configured to execute the instructions stored in the memory, and the processor executes the instructions stored in the memory to enable the processor to perform the method according to any one of the second aspect or the possible designs of the second aspect.

According to an eighth aspect, a computer-readable storage medium is provided, where the computer-readable storage medium stores a computer program, and when the program is executed by a processor, the method according to any one of the second aspect or the possible designs of the second aspect is implemented.

According to the uplink transmission method and apparatus in embodiments of this application, a terminal device receives a first message sent by an access network device, where the first message is used to configure a first uplink resource, and the terminal device performs uplink transmission on the first uplink resource. The first uplink resource includes at least a first part and a second part in a first time period. Uplink transmission between the first part and the second part may meet at least one of the following: a phase deviation of uplink transmission between the first part and the second part falls within a first threshold range, or a power deviation of uplink transmission between the first part and the second part falls within a second threshold range. The terminal device controls the phase deviation of uplink transmission between the first part and the second part to fall within the first threshold range, and/or controls the power deviation of uplink transmission between the first part and the second part to fall within the second threshold range. In this way, the access network device can perform filtering for a long time in the first time period, to improve channel estimation quality and enhance uplink coverage. In this method, no additional DMRS needs to be added, so that DMRS resource overheads are reduced, and uplink spectrum utilization is improved.

DESCRIPTION OF EMBODIMENTS

Terms such as "first" and "second" in embodiments of this application are only used for distinguishing and description, but cannot be understood as an indication or implication of relative importance, or an indication or implication of an order. In addition, the terms "include", "comprise", or any other variant thereof are intended to cover a non-exclusive inclusion, for example, a series of steps or units. Methods, systems, products, or devices are not necessarily limited to those steps or units that are literally listed, but may include other steps or units that are not literally listed or that are inherent to such processes, methods, products, or devices.

It should be understood that in this application, "at least one (item)" refers to one or more, and "a plurality or refers to two or more. The term "and/or" is used for describing an association relationship between associated objects, and represents that three relationships may exist. For example, "A and/or B" may represent the following cases: Only A exists, only B exists, and both A and B exist, where A and B may be singular or plural. The character "/" generally represents an "or" relationship between the associated objects. "At least one of" the following items (pieces)" or a similar expression thereof represents any combination of these items, including a single item (piece) or any combination of a plurality of items (pieces). For example, at least one item (piece) of a, b, or c may represent a, b, c, "a and b", "a and c", "b and c", or "a, b, and c", where a, b, and c may be singular or plural.

Figure 1:
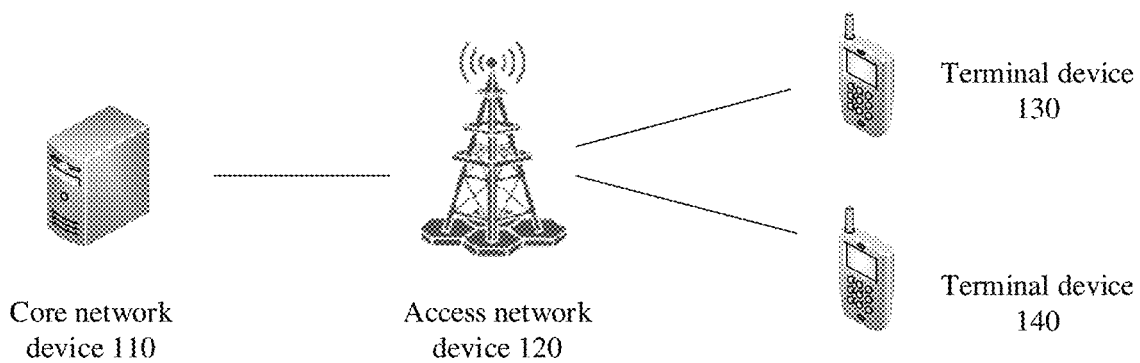
FIG. 1 is a schematic diagram of an architecture of a mobile communication system to which an embodiment of this application is applied.

FIG. 1 is a schematic diagram of an architecture of a mobile communication system to which an embodiment of this application is applied. As shown in FIG. 1, the mobile communication system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device may be independent and different physical devices, a function of the core network device and a logical function of the radio access network device may be integrated into a same physical device, or a part of functions of the core network device and a part of functions of the radio access network device may be integrated into one physical device. The terminal device may be located at a fixed position, or may be mobile. FIG. 1 is merely a schematic diagram. The communication system may further include other network devices, for example, may further include a wireless relay device and a wireless backhaul device, which are not shown in FIG. 1. A quantity of core network devices, a quantity of radio access network devices, and a quantity of terminal devices included in the mobile communication system are not limited in embodiments of this application.

The radio access network device is an access device used by a terminal device to access the mobile communication system in a wireless manner, and may be a base station (e.g, NodeB), an evolved NodeB (eNodeB), a base station in an NR mobile communication system, a base station in a future mobile communication system, an access node in a WiFi system, or the like. A specific technology and a specific device form used by the radio access network device are not limited in embodiments of this application.

The terminal device may also be referred to as a terminal, user equipment (UE), a mobile station (MS), a mobile terminal (MT), or the like. The terminal device may be a mobile phone, a tablet computer (pad), a computer with a wireless receiving and sending function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

The radio access network device and the terminal device may be deployed on land, including indoors or outdoors, or handheld or vehicle-mounted; may be deployed on water; or may be deployed on an airplane, a balloon, and a satellite in the air. Application scenarios of the radio access network device and the terminal device are not limited in embodiments of this application.

Embodiments of this application may be applied to downlink signal transmission, may be applied to uplink signal transmission, or may be applied to device-to-device (D2D) signal transmission. For the downlink signal transmission, a sending device is a radio access network device, and correspondingly a receiving device is a terminal device. For the uplink signal transmission, a sending device is a terminal device, and correspondingly a receiving device is a radio access network device. For the D2D signal transmission, a sending device is a terminal device, and correspondingly a receiving device is also a terminal device. A direction of signal transmission is not limited in embodiments of this application.

Communication between the radio access network device and the terminal device and communication between terminal devices may be performed by using a licensed spectrum, may be performed by using an unlicensed spectrum, or may be performed by using both of a licensed spectrum and an unlicensed spectrum. A spectrum below 6 G or a spectrum above 6 G or both of a spectrum below 6 G and a spectrum above 6 G may be used for communication between the radio access network device and the terminal device, and between the terminal devices. A spectrum resource used between the radio access network device and the terminal device is not limited in embodiments of this application.

Figure 2:
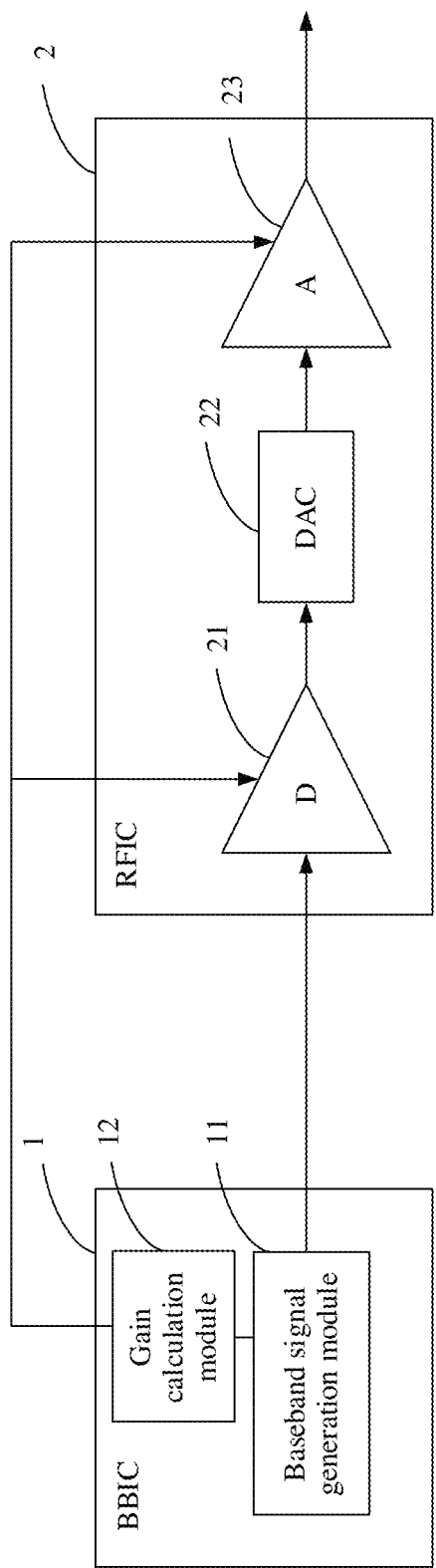
FIG. 2 is a schematic diagram of some modules used in uplink transmission according to an embodiment of this application.

FIG. 2 is a schematic diagram of some modules used in uplink transmission according to an embodiment of this application. As shown in FIG. 2, the some modules used in the uplink transmission may include a baseband integrated circuit (BBIC) 1 and a radio frequency integrated circuit (RFIC) 2. The BBIC 1 and the RFIC 2 may be two chips. A baseband signal generation module 11 of the BBIC 1 is configured to generate a normalized baseband signal, and a gain calculation module 12 calculates a gain of the normalized baseband signal. The gain calculation module 12 sends the gain to the RFIC 2. The RFIC 2 implements, through two-level adjustment in a digital domain (a digital domain amplifier 21 shown in FIG. 2) and an analog domain (an analog domain amplifier 23 shown in FIG. 2), the gain sent by the gain calculation module.

Gain adjustment or enabling/disabling in the analog domain causes a phase jump in uplink transmission. Gain adjustment in the digital domain does not cause a phase jump in uplink transmission. However, a gain adjustment module in the digital domain should not make a great adjustment, because excessively large digital domain power causes saturation of a digital-to-analog converter (DAC) 22, and excessively small digital domain power reduces efficiency of the DAC. It should be ensured that digital domain power entering the DAC 22 is relatively stable around a value.

Power adjustment of uplink transmission causes gain adjustment in the analog domain, and enabling/disabling in an uplink analog domain enables/disables an analog domain gain module. Consequently, a phase jump of uplink transmission is caused.

To resolve a problem of limited uplink coverage, quality of channel estimation is improved, and uplink coverage is enhanced. Embodiments of this application provide an uplink transmission method. In this method, filtering is performed for a longer time in time domain, so that channel estimation quality is improved, and uplink coverage is enhanced. In this method, no additional DMRS needs to be added, so that DMRS resource overheads are reduced, and uplink spectrum utilization is improved. In embodiments of this application, phase continuity of uplink transmission within a period of time is implemented by using implementations of the following embodiments, so that filtering can be performed for a longer time in time domain, and channel estimation quality is improved.

A phase of uplink transmission in embodiments of this application refers to a phase change generated by gain adjustment in the analog domain, for example, a phase change generated after analog domain gain adjustment is performed by the analog domain amplifier 23 on uplink information output by the DAC 22.

Uplink information in embodiments of this application may be physical layer data, physical layer control information, a sounding reference signal (SRS), random access information, or the like. For example, the uplink information may be uplink data carried on a physical uplink shared channel (PUSCH), or uplink information carried on a physical uplink control channel (PUCCH).

The PUSCH may include a PUSCH based on dynamic scheduling or a configured grant PUSCH. For the PUSCH based on dynamic scheduling, the terminal device receives uplink scheduling for one time, for example, receives radio resource control (RRC) signaling, a media access control-control element (MAC-CE), or downlink control information (DCI), and the terminal device performs PUSCH transmission for one time based on the uplink scheduling. The configured grant PUSCH is periodic, and each period may include one group of transmit opportunities, for example, K transmit opportunities. The configured grant PUSCH may be classified into a type 1 configured grant PUSCH and a type 2 configured grant PUSCH. For the type 1 configured grant PUSCH, the access network device may configure some semi-persistent resources for the terminal device by using RRC signaling. If the terminal device needs to transmit uplink data, the terminal device may use the semi-persistent resources to perform uplink transmission. If the terminal device does not need to transmit uplink data, the terminal device may not use the semi-persistent resources to perform uplink transmission. For the type 2 configured grant PUSCH, the access network device may configure some semi-persistent resource parameters for the terminal device by using RRC signaling, and then configure some semi-persistent resource parameters by using physical layer signaling and activate a semi-persistent resource, or may deactivate the semi-persistent resource by using physical layer signaling. When the semi-persistent resource is activated, the terminal device may use the semi-persistent resource to perform uplink transmission. When the semi-persistent resource is not activated or deactivated, the terminal device cannot use the semi-persistent resource to perform uplink transmission.

The PUCCH may be periodic, semi-persistent, or dynamically scheduled with a physical downlink shared channel (PDSCH).

The SRS may be classified into three modes: a periodic SRS, a semi-persistent SRS, and an aperiodic SRS. For the periodic SRS or the semi-persistent SRS, a period in a unit of a slot and one slot offset are configured. A value range of the period is {1, 2, 4, 5, 8, 10, 16, 20, 32, 40, 64, 80, 160, 320, 640, 1280, 2560}. For the aperiodic SRS, a slot-level offset is configured. The offset is a slot spacing between triggering the DCI and actual SRS transmission. The offset may be any value from 0 to 32. When the offset is 0, it indicates that the DCI is triggered in a same slot as the SRS being transmitted.

In embodiments of this application, an example in which the slot is a slot in the NR system is used for description, and a protection scope of embodiments of this application is not limited thereto.

A transmit opportunity (transmission occasion) in embodiments of this application may be one or more repetitions of uplink information. Repeated uplink information herein may be a repeated physical uplink shared channel (PUSCH), a repeated physical uplink control channel (PUCCH), a repeatedly sent sounding reference signal (SRS), or a repeated random access channel (RACH).

Figure 3:
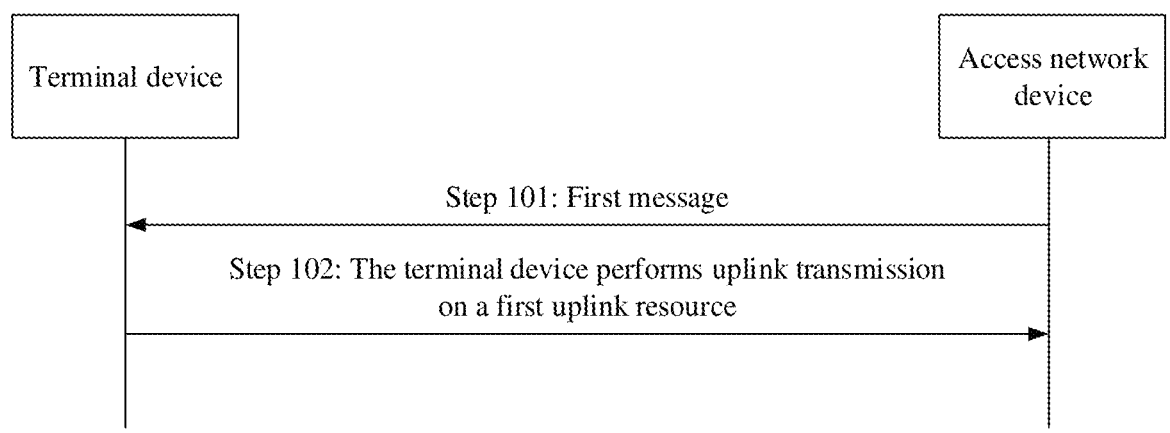
FIG. 3 is a flowchart of an uplink transmission method according to an embodiment of this application.

FIG. 3 is a flowchart of an uplink transmission method according to an embodiment of this application. The method in this embodiment relates to a terminal device and an access network device. As shown in FIG. 3, the method in this embodiment may include the following steps:

Step 101: An access network device sends a first message to a terminal device.

The terminal device receives the first message sent by the access network device. The first message is used to configure a first uplink resource.

The first uplink resource may be a resource carrying any uplink information, for example, any one of a PUSCH resource, a PUCCH resource, a RACH resource, or a resource for sending a sounding reference signal (SRS). The first uplink resource may be dynamically scheduled, semi-persistent, or periodic.

Dynamic scheduling in this embodiment of this application refers to physical layer signaling scheduling, for example, DCI scheduling. For example, the first uplink resource may be an uplink resource scheduled by using DCI. A periodic resource in this embodiment of this application is a periodic resource that is configured by using RRC signaling and that can be used for or that is used for uplink transmission. For example, the first uplink resource may be a periodic resource that is configured by using RRC signaling and that can be used for uplink transmission.

A semi-persistent resource in this embodiment of this application is a resource that is periodic and that is configured by using RRC signaling and that can be used for uplink transmission after the resource is activated by using a MAC-CE or DCI.

Step 102: The terminal device performs uplink transmission on the first uplink resource.

The access network device performs uplink reception on the first uplink resource.

The first uplink resource includes at least a first part and a second part in a first time period. Uplink transmission between the first part and the second part may meet at least one of the following: a phase deviation of uplink transmission between the first part and the second part falls within a first threshold range, or a power deviation of uplink transmission between the first part and the second part falls within a second threshold range. In other words, the phase deviation of uplink transmission between the first part and the second part falls within the first threshold range, and/or the power deviation of uplink transmission between the first part and the second part falls within the second threshold range.

The first time period is duration between a start time and an end time of the first uplink resource in a first time length, or the first time period is duration between a start time and an end time of the first uplink resource in a first transmit opportunity. It should be noted that the first time length in this embodiment of this application may be a time length, for example, two slots. The first time length may be any two slots in time domain, and has no meaning of a time domain location. The first time period not only has a meaning of a time length, but also has a meaning of a time domain location. This is different from the first time length. In other words, the first time period has a time period with a specific location in time domain. In this embodiment of this application, the first time period may be determined based on the first time length and a time domain location of the first uplink resource. The first time length may be preset, or may be configured by the access network device. The first transmit opportunity may be a preset quantity of transmit opportunities (for example, M transmit opportunities) or first uplink resource transmission for one time (for example, PUSCH transmission for one time, and the PUSCH transmission for one time may include several transmit opportunities). The first transmit opportunity may be predefined, or may be configured by the access network device.

Figure 4A:
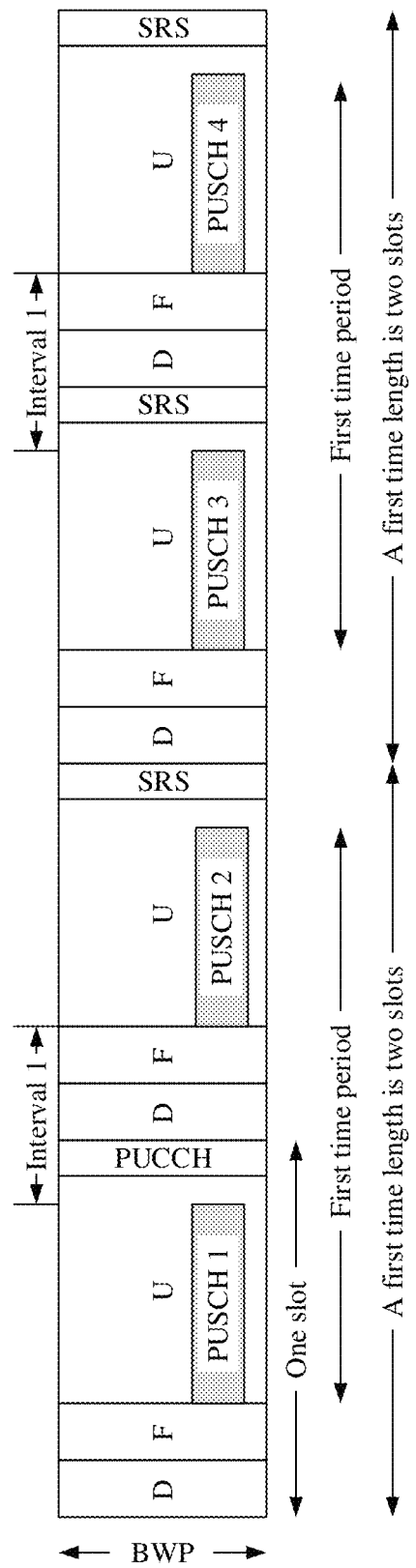
FIG. 4A is a schematic diagram of a first time period according to an embodiment of this application.

For example, FIG. 4A is a schematic diagram of a first time period according to an embodiment of this application. It is assumed that the first time length is two slots, and the first uplink resource is a PUSCH 1, a PUSCH 2, a PUSCH 3, and a PUSCH 4, the first time period is duration between a start time of the PUSCH 1 and an end time of the PUSCH 2 in the two slots, and is duration between a start time of the PUSCH 3 and an end time of the PUSCH 4 in the two slots.

Figure 4B:
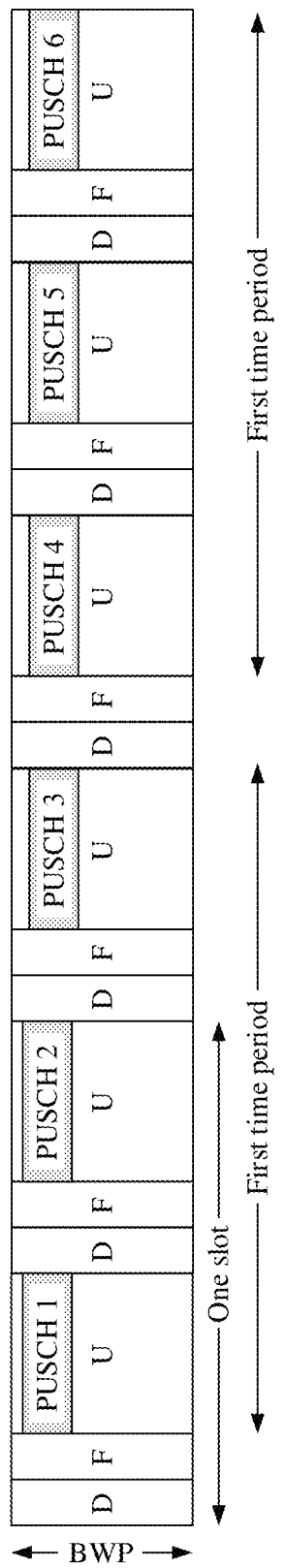
FIG. 4B is a schematic diagram of another first time period according to an embodiment of this application.
Figure 5:
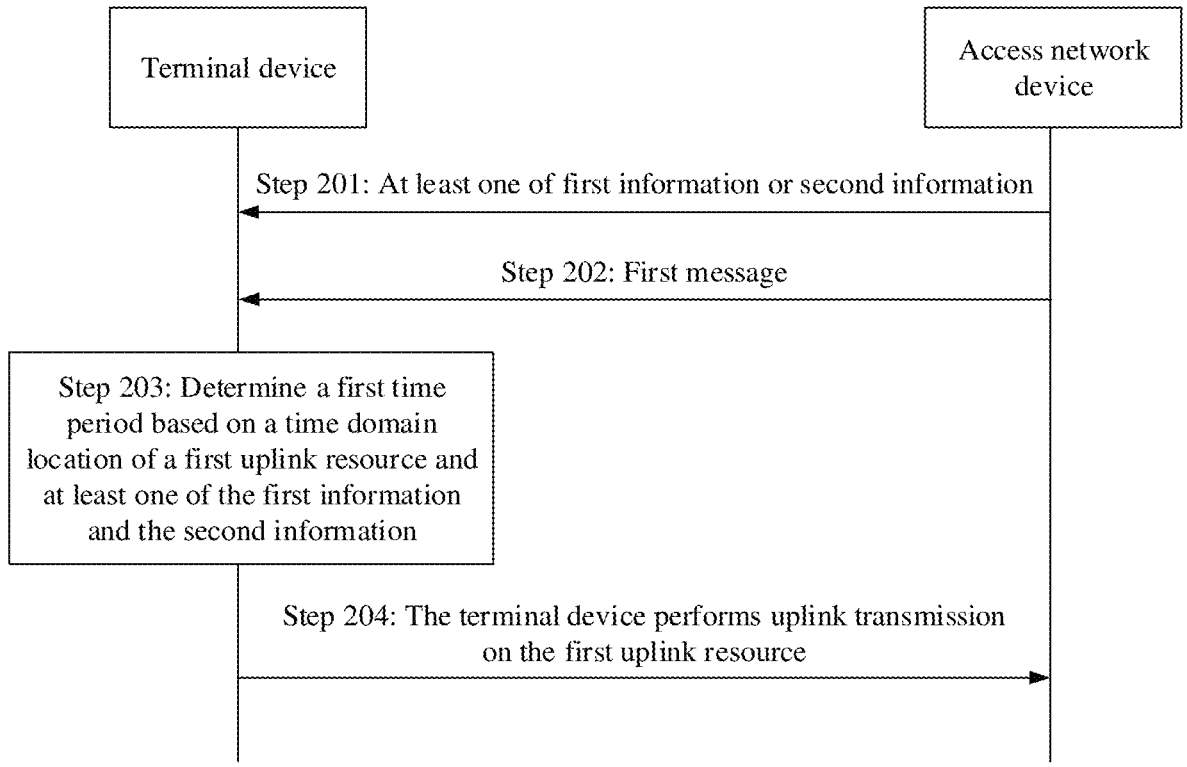
FIG. 5 is a flowchart of another uplink transmission method according to an embodiment of this application.

FIG. 4B is a schematic diagram of another first time period according to an embodiment of this application. It is assumed that the first uplink resource is a PUSCH, PUSCH transmission for one time includes six transmit opportunities, as shown in FIG. 4B, the six transmit opportunities are a PUSCH 1, PUSCH 2, PUSCH 3, PUSCH 4, a PUSCH 5, and a PUSCH 6, and the first transmit opportunity is every three transmit opportunities in the six transmit opportunities. In this case, the first time period is duration between a start time of the PUSCH and an end time of the PUSCH in three transmit opportunities. For example, as shown in FIG. 5, the first time period is duration between a start time of a PUSCH 1 and an end time of a PUSCH 3, and is duration between a start time of a PUSCH 4 and an end time of a PUSCH 6.

The first part and the second part meet at least one of the following: a time domain interval between the first part and the second part is greater than 0 time domain resource units, or the first part and the second part are located in different slots. A time domain resource unit may be one Tc, several Tc, one Ts, several Ts, one symbol, several symbols, or a slot. $T_c=1/(\Delta f_{max} \cdot N_f)$, where $\Delta f_{max}=480 \cdot 10^3$ Hz, and $N_f=4096$. $T_s=1/(\Delta f_{ref} \cdot N_{f,ref})$ where $\Delta f_{ref}=15 \cdot 10^3$ HZ, and $N_{f,ref}=2048$. Tc refers to a basic time unit (basic time unit for NR) in NR, and Ts refers to a basic time unit (basic time unit for LTE) in LTE.

The time domain interval between the first part and the second part may be an interval between an end location of the first part in time domain and a start location of the second part in time domain. N is used to represent the time domain interval between the first part and the second part. In some embodiments, N>0. FIG. 4A is used as an example for further description. The first part may be a PUSCH 1, the second part may be a PUSCH 2, the time domain interval between the first part and the second part is an interval 1 shown in FIG. 4A, and the interval 1 is greater than 0 time domain resource units.

It should be noted that the first uplink resource includes at least the first part and the second part in the first time period. It may be understood that the first uplink resource may further include another part in the first time period, for example, a third part. The third part may be a time domain resource that does not carry uplink information, or may be a time domain resource that carries other uplink information. FIG. 4A is used as an example for further description. In addition to the first part (PUSCH 1) and the second part (PUSCH 2), the first uplink resource (PUSCH) in the first time period further includes a PUCCH, a downlink resource (D), a flexible symbol (F), and the like. The flexible symbol is generally located between a downlink resource and an uplink resource, and the flexible symbol may be configured as a downlink symbol or an uplink symbol by using physical layer signaling, to flexibly support a traffic burst.

In this embodiment of this application, frequency domain resources in the first part and the second part may be the same, so that channel estimation filtering in time domain is performed in the first part and the second part.

In some other embodiments, N=0, that is, there is no time domain interval between the first part and the second part, and the first part and the second part are consecutive in time domain. When there is no time domain interval between the first part and the second part, the first part and the second part are located in different slots. In other words, an end location of the first part in time domain is a last symbol of one slot, and a start location of the second part in time domain is a first symbol of one next slot.

Phase deviation of uplink transmission in this embodiment of this application is a difference between any two phase changes of uplink transmission between the first part and the second part, and the phase changes may be generated by the foregoing gain adjustment in the analog domain. The phase deviation falls within the first threshold range.

For example, the first threshold range may be [−a, a], and B represents the phase deviation of uplink transmission between the first part and the second part. In this case, a value of B meets: −a<B<a, or −a≤B≤a.

In some embodiments, the first threshold range may be related to the time domain interval between the first part and the second part. For example, the first threshold range may be [−(N+1) a, (N+1) a]. In this case, a value of B meets: −(N+1) a<B<(N+1) a, or −(N+1) a≤B≤(N+1) a.

In some embodiments, the first threshold range may be preset, or may be determined based on N. In other words, the first threshold range is determined based on the time domain interval between the first part and the second part. For example, a larger time domain interval between the first part and the second part indicates a larger first threshold range. For example, when the time domain interval between the first part and the second part is one symbol, the first threshold range is [−1, 1]. When the time domain interval between the first part and the second part is three symbols, the first threshold range is [−3, 3].

Phase deviation of uplink transmission in this embodiment of this application may alternatively be a difference of phase changes between a last pilot symbol in time domain of the first part and a first pilot symbol in time domain of the second part, and the phase changes may be generated by the foregoing gain adjustment in the analog domain. The phase deviation falls within the first threshold range.

For example, the first threshold range may be [−a, a], and B represents a phase deviation of uplink transmission between the last pilot symbol in time domain of the first part and the first pilot symbol in time domain of the second part. In this case, a value of B meets: −a<B<a, or −a≤B≤a.

In some embodiments, the first threshold range may be related to a time domain interval between the last pilot symbol in time domain of the first part and the first pilot symbol in time domain of the second part. For example, the first threshold range may be [−(N+1) a, (N+1) a]. In this case, a value of B meets: −(N+1) a<B<(N+1) a, or −(N+1) a≤B≤(N+1) a.

In some embodiments, the first threshold range may be preset, or may be determined based on N. In other words, the first threshold range is determined based on a time domain interval between the last pilot symbol in time domain of the first part and the first pilot symbol in time domain of the second part. For example, a larger time domain interval between the last pilot symbol in time domain of the first part and the first pilot symbol in time domain of the second part indicates a larger first threshold range. For example, when the time domain interval between the last pilot symbol in time domain of the first part and the first pilot symbol in time domain of the second part is one symbol, the first threshold range is [−1, 1]. When the time domain interval between the last pilot symbol in time domain of the first part and the first pilot symbol in time domain of the second part is three symbols, the first threshold range is [−3, 3].

Power deviation of uplink transmission in this embodiment of this application is a difference of transmit power of uplink transmission for any two times between the first part and the second part. This is similar to phase deviation of uplink transmission. The power deviation falls within the second threshold range. For example, the second threshold range may be [−c, c], and D represents the power deviation of uplink transmission between the first part and the second part. In this case, a value of D meets: −c<D<c, or −c≤D≤c. For example, c may be 1 dB, or any value less than 1, such as 0.5 dB.

In some embodiments, the second threshold range may be related to the time domain interval between the first part and the second part. The second threshold range may be preset, or may be determined based on N. In other words, the second threshold range is determined based on the time domain interval between the first part and the second part. For example, a larger time domain interval between the first part and the second part indicates a larger second threshold range.

For the first part, that is, for each symbol in the first part, a phase deviation of uplink transmission of each symbol in the first part falls within the first threshold range; for the second part, that is, for each symbol in the second part, a phase deviation of uplink transmission of each symbol in the second part falls within the first threshold range; and/or for the first part, a power deviation of uplink transmission of each symbol in the first part falls within the second threshold range, and for the second part, a power deviation of uplink transmission of each symbol in the second part falls within the second threshold range; and/or for the first part, power of uplink transmission of all symbols in the first part is the same, and for the second part, power of uplink transmission of all symbols in the second part is the same.

In some embodiments, the access network device performs uplink reception on the first uplink resource, and performs channel estimation. A manner in which the access network device performs channel estimation may be as follows: The access network device performs channel estimation on the first part based on a pilot signal of the first part, and performs channel estimation on the second part based on a pilot signal of the second part; the access network device performs channel estimation on the first part based on a pilot signal of the first part, and performs channel estimation on the second part based on a pilot signal of the first part; or the access network device performs channel estimation on the second part based on a pilot signal of the first part, and performs channel estimation on the second part based on a pilot signal of the second part.

In this embodiment, the terminal device receives the first message sent by the access network device, where the first message is used to configure the first uplink resource, and the terminal device performs uplink transmission on the first uplink resource. The first uplink resource includes at least a first part and a second part in a first time period. Uplink transmission between the first part and the second part may meet at least one of the following: a phase deviation of uplink transmission between the first part and the second part falls within a first threshold range, or a power deviation of uplink transmission between the first part and the second part falls within a second threshold range. The terminal device controls the phase deviation of uplink transmission between the first part and the second part to fall within the first threshold range, and/or controls the power deviation of uplink transmission between the first part and the second part to fall within the second threshold range. In this way, the access network device can perform filtering for a long time in the first time period, to improve channel estimation quality and enhance uplink coverage. In this method, no additional DMRS needs to be added, so that DMRS resource overheads are reduced, and uplink spectrum utilization is improved.

FIG. 5 is a flowchart of another uplink transmission method according to an embodiment of this application. The method in this embodiment relates to a terminal device and an access network device. In this embodiment, the access network device configures a first time length or a quantity M of first transmit opportunities, a target channel, or a target signal for the terminal device. As shown in FIG. 5, the method in this embodiment may include the following steps.

Step 201: The access network device sends at least one of first information or second information to the terminal device.

The terminal device receives the first information sent by the access network device, where the first information indicates the first time length, or the first information indicates the quantity M of first transmit opportunities, and the quantity M of first transmit opportunities is used to determine the first transmit opportunity.

The second information indicates to perform uplink transmission on a first uplink resource. Uplink transmission of the first uplink resource between a first part and a second part that are included in a first time period meets the following phase deviation and/or power deviation conditions, so that the access network device can perform filtering for a long time in the first time period.

In other words, the second information indicates the target channel or the target signal, and when the terminal device performs uplink transmission on the target channel or on a resource for sending the target signal, the terminal device performs phase control and/or power control in a manner of the following steps. The target channel may be any one of the foregoing PUSCHs or PUCCHs, and the target signal may be an SRS.

The second information may be 2-bit information. For example, 00 indicates a PUSCH, and 01 indicates a PUCCH. Alternatively, the second information may be 1 bit in DCI for scheduling a PUSCH, to indicate that a scheduled PUSCH is the target channel. Alternatively, the second information may be 1 bit in DCI for scheduling a PDSCH, to indicate that a PUCCH carrying an ACK/a NACK corresponding to a scheduled PDSCH is the target channel. Alternatively, a specific form of the second information may be another form, and a protection scope of the second information is not limited thereto.

The first information and the second information may be sent by using a same message, or may be sent by using different messages. For example, the first information is sent by using a fourth message, and the fourth message may be RRC signaling, a MAC-CE, DCI, or the like. The second information is sent by using a fifth message, and the fifth message may be RRC signaling, a MAC-CE, DCI, or the like. In another implementation, the first information and the second information may jointly indicate. For example, 2-bit information indicates the target channel and the quantity M of first transmit opportunities. For example, 00 indicates that the target channel is a PUSCH, and the quantity M of first transmit opportunities is a quantity of transmit opportunities included in transmission for one time of the PUSCH. For example, the quantity M of first transmit opportunities may be 6.

It should be noted that, in some embodiments, the first information may alternatively be sent by using a following first message. In other words, the first information is carried in the first message. In some other embodiments, the second information may alternatively be sent by using the following first message. To be specific, the second information is carried in the first message. For example, the second information may be 1 bit in DCI for scheduling a PUSCH, to indicate that a scheduled PUSCH is the target channel. In some other embodiments, both of the first information and the second information are sent by using the following first message. In other words, the first information and the second information are carried in the first message.

Step 202: The access network device sends the first message to the terminal device.

The terminal device receives the first message sent by the access network device. The first message is used to configure a first uplink resource. The first message is used to configure a time-frequency domain location of the first uplink resource (for example, the target channel or the target signal described above). For specific explanations and descriptions of step 202, refer to step 101 in the embodiment shown in FIG. 3. Details are not described herein again.

It should be noted that a sequence of step 201 and step 202 is not limited by a sequence number. For example, step 202 may be performed before step 201.

Step 203: The terminal device determines a first time period based on the time domain location of the first uplink resource and at least one of the first information and the second information.

The first time period is duration between a start time and an end time of the first uplink resource in a first time length, or the first time period is duration between a start time and an end time of the first uplink resource in a first transmit opportunity.

In an implementation, the access network device sends the first information to the terminal device, and the terminal device determines the first time period based on the first information, a preset target channel or a target signal, and the time domain location of the first uplink resource.

In another implementation, the access network device sends the second information to the terminal device, and the terminal device determines the first time period based on the second information, a preset first time length or a first transmit opportunity, and the time domain location of the first uplink resource.

In still another possible implementation, the access network device sends the first information and the second information to the terminal device, and the terminal device determines the first time period based on the first information and the second information, and the time domain location of the first uplink resource.

For example, a time length of the first time period determined by the terminal device is greater than one slot. A manner in which the access network device sends the first information and the second information to the terminal device is used as an example for description. The first time length configured by using the first information is two slots, the target channel configured by using the second information is a PUSCH, and a time-frequency domain resource of the PUSCH shown in FIG. 4A is configured by using the first message. Step 203 is performed, so that the terminal device may determine the first time period shown in FIG. 4A. The first time period is duration between a start time and an end time of a PUSCH in two slots.

The first information indicates a quantity M of first transmit opportunities, and the quantity M of first transmit opportunities is used to determine a first transmit opportunity. The first uplink resource includes P transmit opportunities, and the P transmit opportunities may be divided into K groups. When P is less than or equal to M, K is 1, and the first transmit opportunity is the P transmit opportunities. When P is greater than M, the first transmit opportunities of first K−1 groups in the K groups include M transmit opportunities, and the first transmit opportunity of a $K^{th}$ group includes P−(K−1)*M transmit opportunities, where $$K = \left\lceil \frac{P}{M} \right\rceil,$$

and $\lceil \ \rceil$ is a rounding up operator.

For example, the quantity M of first transmit opportunities configured by using the first information is 3, the target channel configured by using the second information is a PUSCH, the first message configures a time-frequency domain resource for PUSCH transmission for one time shown in FIG. 4B, and the PUSCH transmission for one time includes 6 (P=6) transmit opportunities. In this case, K=2. Step 203 is performed, so that the terminal device may determine the first time period shown in FIG. 4B. The first time period is duration between a start time and an end time of the PUSCH in every three transmit opportunities.

Step 204: The terminal device performs uplink transmission on the first uplink resource.

The first uplink resource includes at least a first part and a second part in a first time period. Uplink transmission between the first part and the second part may meet at least one of the following: a phase deviation of uplink transmission between the first part and the second part falls within a first threshold range, or a power deviation of uplink transmission between the first part and the second part falls within a second threshold range.

When the terminal device performs uplink transmission on the first uplink resource, the terminal device may control a phase and/or power of uplink transmission on the first uplink resource in the first time period. The terminal device may control the phase deviation of uplink transmission between the first part and the second part in the first time period to fall within the first threshold range, and/or control the power deviation of uplink transmission between the first part and the second part in the first time period to fall within the second threshold range, to ensure that phases of uplink transmission on the first uplink resource in the first time period are continuous or phase deviations fall within a specific range. In this way, the access network device can perform filtering in the first time period, to improve channel estimation quality.

In this embodiment, the access network device sends at least one of the first information or the second information to the terminal device, where the first information indicates the first time length, or the first information indicates the quantity M of first transmit opportunities, and the quantity M of first transmit opportunities is used to determine the first transmit opportunity. The access network device sends the first message to the terminal device, where the first message is used to configure the first uplink resource. The terminal device determines the first time period based on at least one of the first information and the second information and the time domain location of the first uplink resource. When the terminal device performs uplink transmission on the first uplink resource, the terminal device controls the phase deviation of uplink transmission between the first part and the second part in the first time period to fall within the first threshold range, and/or controls the power deviation of uplink transmission between the first part and the second part in the first time period to fall within the second threshold range, to ensure that phases of uplink transmission of the first uplink resource in the first time period are continuous or phase deviations fall within a specific range. In this way, the access network device can perform filtering in the first time period, to improve channel estimation quality.

In this embodiment of this application, the phase deviation of uplink transmission between the first part and the second part in the first time period may be controlled to fall within the first threshold range, and/or the power deviation of uplink transmission between the first part and the second part in the first time period may be controlled to fall within the second threshold range in the following several manners.

In a first manner, the terminal device does not receive downlink information in the first time period.

For a time division multiplexing (TDD) mode, the terminal device may not receive the downlink information in the first time period. In other words, the terminal device ignores the downlink information. The downlink information is not received in the first time period, to avoid a phase jump of uplink transmission caused by uplink-downlink switching, and ensure that phases of uplink transmission on the first uplink resource in the first time period are continuous or phase deviations fall within a specific range. In this way, the access network device can perform filtering in the first time period, to improve channel estimation quality.

In a second manner, the terminal device does not send uplink information of another uplink resource in the first time period. For example, the first uplink resource is a PUSCH, and the terminal device does not send uplink information of an uplink resource other than the PUSCH in the first time period. For example, the terminal device does not send uplink information of a PUCCH in the first time period. The second manner is explained and described below by using a specific embodiment.

Figure 6:
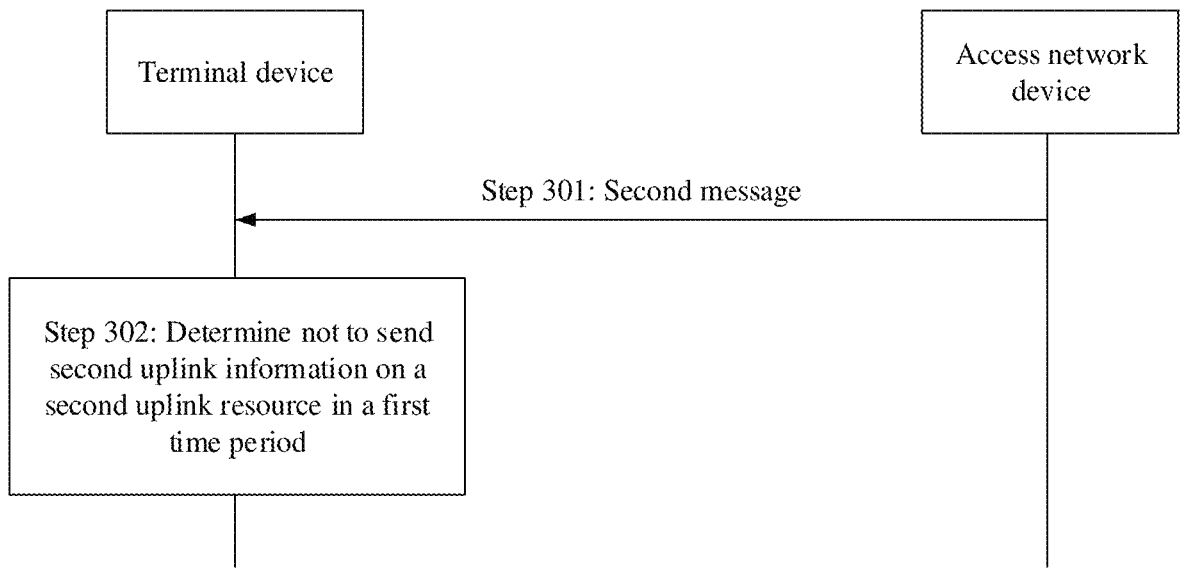
FIG. 6 is a flowchart of another uplink transmission method according to an embodiment of this application.

FIG. 6 is a flowchart of another uplink transmission method according to an embodiment of this application. The method in this embodiment relates to a terminal device and an access network device. Based on FIG. 3 or FIG. 5, in this embodiment, as shown in FIG. 6, the method in this embodiment may further include the following steps:

Step 301: The access network device sends a second message to the terminal device.

The terminal device receives the second message sent by the access network device, where the second message is used to configure a second uplink resource, and the second uplink resource is used to send second uplink information.

The first uplink resource in the foregoing embodiment is used to send first uplink information, and the second uplink resource in this embodiment is used to send the second uplink information. The first uplink information and the second uplink information are information about different types of uplink physical layer channels or different types of uplink physical layer signals. Alternatively, one of the first uplink information and the second uplink information is information about an uplink physical layer channel, and the other is an uplink physical layer signal. Alternatively, the first uplink information and the second uplink information belong to different power control processes. Alternatively, the first uplink information and the second uplink information are information about a same type of uplink physical layer channels and correspond to different hybrid automatic repeat request (HARQ) identification numbers.

For example, the first uplink information is uplink data carried on a PUSCH, the second uplink information is uplink information carried on a PUCCH, and the first uplink information and the second uplink information are information about different types of uplink physical layer channels. In other words, an uplink physical layer channel of the first uplink information and an uplink physical layer channel of the second uplink information are different types of channels.

For example, the PUSCH 1 or the PUSCH 2 shown in FIG. 4A and the PUSCH 3 or the PUSCH 4 belong to different power control processes. The first uplink information is uplink data carried on the PUSCH 1 or the PUSCH 2 shown in FIG. 4A. The second uplink information is uplink data carried on the PUSCH 3 or the PUSCH 4 shown in FIG. 4A. The first uplink information and the second uplink information belong to different power control processes.

Step 302: The terminal device determines not to send the second uplink information on the second uplink resource in the first time period.

For example, the second message is used to configure the PUCCH shown in FIG. 4A. In this case, the second uplink resource is a PUCCH, and the terminal device determines not to send the second uplink information on the PUCCH in the first time period. In other words, the terminal device does not perform uplink transmission on the PUCCH in the first time period.

In this embodiment, the terminal device determines not to send the second uplink information on the second uplink resource in the first time period, to control a phase deviation of uplink transmission between a first part and a second part in the first time period to fall within a first threshold range, and/or control a power deviation of uplink transmission between the first part and the second part in the first time period to fall within a second threshold range, and ensure that phases of uplink transmission on the first uplink resource in the first time period are continuous or phase deviations fall within a specific range. In this way, the access network device can perform filtering in the first time period, to improve channel estimation quality.

In a third manner, the terminal device does not send uplink information of a periodic or semi-persistent uplink resource in the first time period, but sends uplink information of a dynamically scheduled uplink resource in a power control manner. The third manner is explained and described below by using a specific embodiment.

Figure 7:
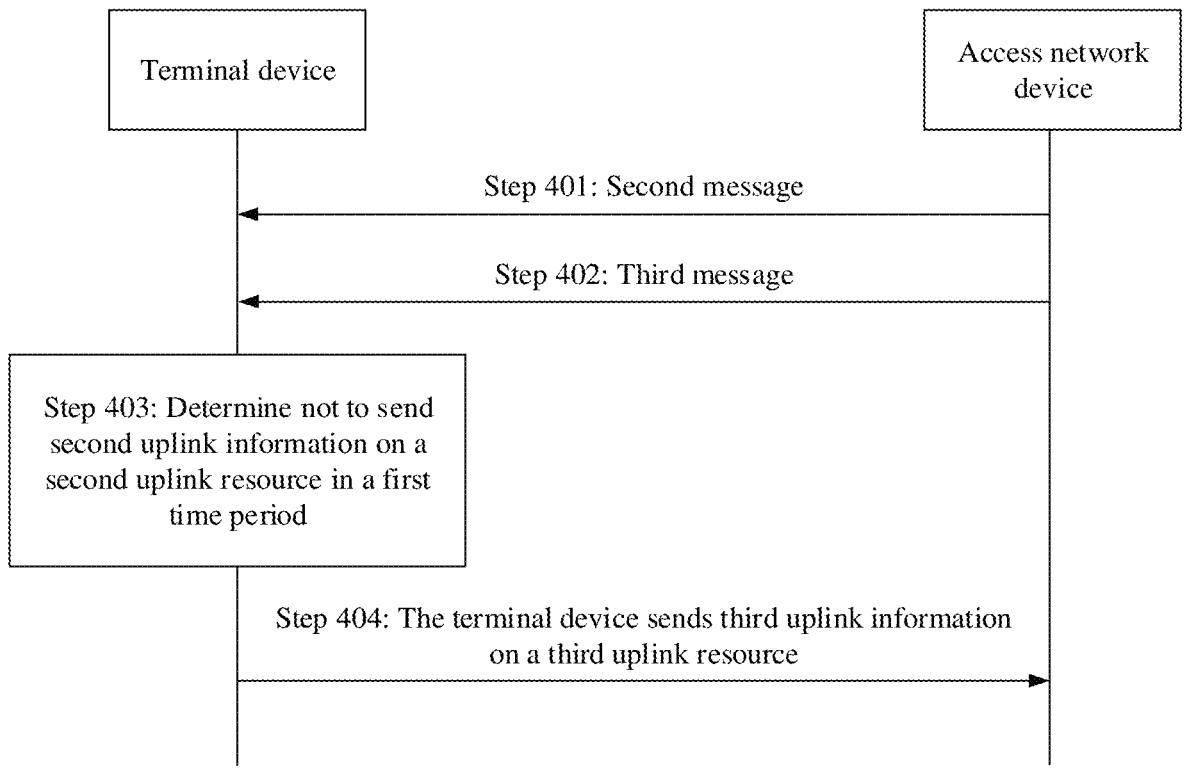
FIG. 7 is a flowchart of another uplink transmission method according to an embodiment of this application.

FIG. 7 is a flowchart of another uplink transmission method according to an embodiment of this application. The method in this embodiment relates to a terminal device and an access network device. Based on FIG. 3 or FIG. 5, in this embodiment, as shown in FIG. 7, the method in this embodiment may further include the following steps:

Step 401: The access network device sends a second message to the terminal device.

The terminal device receives the second message sent by the access network device, where the second message is used to configure a second uplink resource, and the second uplink resource is used to send second uplink information.

For explanations and descriptions of step 401, refer to step 301 in the embodiment shown in FIG. 6. Details are not described herein again. It should be noted that the second uplink resource in this embodiment is a periodic or semi-persistent uplink resource.

Step 402: The access network device sends a third message to the terminal device.

The terminal device receives the third message sent by the access network device, where the third message is used to configure a third uplink resource, the third uplink resource is a dynamically scheduled uplink resource, and the third uplink resource is used to send third uplink information.

Step 403: The terminal device determines not to send the second uplink information on the second uplink resource in the first time period.

Step 404: The terminal device sends the third uplink information on the third uplink resource.

A power deviation of uplink transmission on the third uplink resource and the first uplink resource in the first time period falls within a second threshold range, or a phase deviation of uplink transmission falls within a first threshold range.

To be specific, the terminal device ignores uplink transmission of a periodic or semi-persistent uplink resource in the first time period. For a dynamically scheduled uplink resource, power or a phase of uplink transmission of the dynamically scheduled uplink resource is affected by power or a phase of uplink transmission of the first uplink resource in the first time period, to ensure that power or phases of uplink transmission on the dynamically scheduled uplink resource and the first uplink resource in the first time period are the same or approximately the same. The approximate same means that a power deviation or a phase deviation of uplink transmission in the first time period is within a specific threshold range, for example, 0.51.

The first uplink information and the third uplink information are information about different types of uplink physical layer channels or different types of uplink physical layer signals. Alternatively, one of the first uplink information and the third uplink information is information about an uplink physical layer channel, and the other is an uplink physical layer signal. Alternatively, the first uplink information and the third uplink information belong to different power control processes. Alternatively, the first uplink information and the third uplink information are information about a same type of uplink physical layer channels and correspond to different hybrid automatic repeat request identification numbers.

In this embodiment, the terminal device determines not to send the second uplink information on the second uplink resource in the first time period, and sends the third uplink information on the third uplink resource, where the power deviation of uplink transmission on the third uplink resource and the first uplink resource in the first time period falls within the second threshold range, or the phase deviation of uplink transmission falls within the first threshold range, to control the phase deviation of uplink transmission between the first part and the second part in the first time period to fall within the first threshold range, and/or the power deviation of uplink transmission between the first part and the second part in the first time period is controlled to fall within the second threshold range, and ensure that phases of uplink transmission on the first uplink resource in the first time period are continuous or phase deviations fall within a specific range. In this way, the access network device can perform filtering in the first time period, to improve channel estimation quality.

In a fourth manner, the terminal device sends uplink information of all uplink resources in a power control manner in the first time period. The fourth manner is explained and described below by using a specific embodiment.

Figure 8:
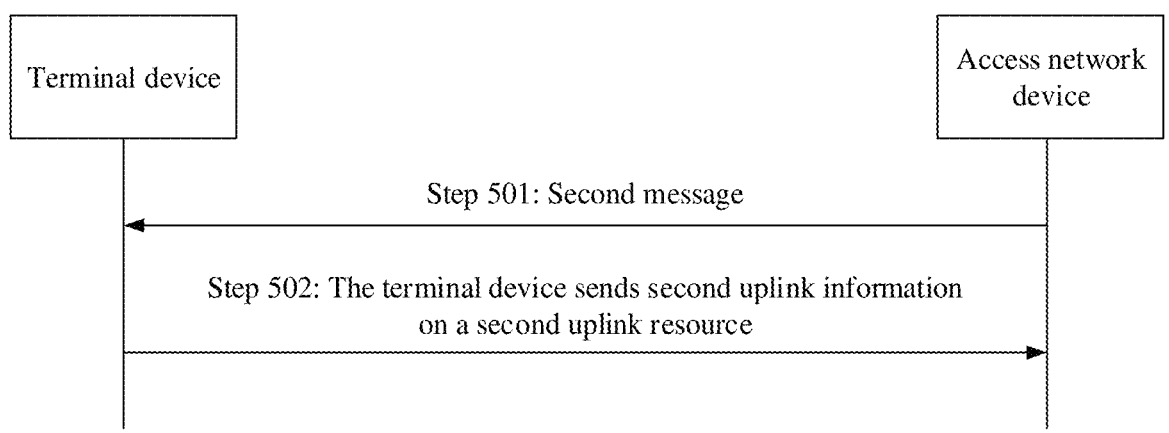
FIG. 8 is a flowchart of another uplink transmission method according to an embodiment of this application.

FIG. 8 is a flowchart of another uplink transmission method according to an embodiment of this application. The method in this embodiment relates to a terminal device and an access network device. Based on FIG. 3 or FIG. 5, in this embodiment, as shown in FIG. 8, the method in this embodiment may further include the following steps:

Step 501: The access network device sends a second message to the terminal device.

The terminal device receives the second message sent by the access network device, where the second message is used to configure a second uplink resource, and the second uplink resource is used to send second uplink information.

For explanations and descriptions of step 401, refer to step 301 in the embodiment shown in FIG. 6. Details are not described herein again.

Step 502: The terminal device sends the second uplink information on the second uplink resource.

A power deviation of uplink transmission on the second uplink resource and the first uplink resource in a first time period falls within a second threshold range, or a phase deviation of uplink transmission falls within a first threshold range.

The first uplink resource is used to send first uplink information. The first uplink information and the second uplink information are information about different types of uplink physical layer channels or different types of uplink physical layer signals. Alternatively, one of the first uplink information and the second uplink information is information about an uplink physical layer channel, and the other is an uplink physical layer signal. Alternatively, the first uplink information and the second uplink information belong to different power control processes. Alternatively, the first uplink information and the second uplink information are information about a same type of uplink physical layer channels and correspond to different hybrid automatic repeat request identification numbers.

To be specific, for uplink transmission on another uplink resource other than the first uplink resource in the first time period, power or a phase of the uplink transmission on the another uplink resource is affected by power or a phase of uplink transmission on the first uplink resource in the first time period, to ensure that power or phases of uplink transmission on the another resource and the first uplink resource in the first time period are the same or approximately the same. For explanations and descriptions of "approximately the same", refer to the explanations and descriptions in step 404. Details are not described herein again.

In this embodiment, the terminal device controls power or a phase of uplink transmission on the another uplink resource other than the first uplink resource in the first time period, to control a phase deviation of uplink transmission between a first part and a second part in the first time period to fall within a first threshold range, and/or control a power deviation of uplink transmission between the first part and the second part in the first time period to fall within a second threshold range, and ensure that phases of uplink transmission on the first uplink resource in the first time period are continuous or phase deviations fall within a specific range. In this way, the access network device can perform filtering in the first time period, to improve channel estimation quality.

It should be noted that the foregoing first manner to the fourth manner may be separately used, or may be used in combination. Examples are not enumerated in this embodiment of this application.

The first manner to the fourth manner are used from a perspective of the terminal device, to control the phase deviation of uplink transmission between the first part and the second part in the first time period to fall within the first threshold range, and/or control the power deviation of uplink transmission between the first part and the second part in the first time period to fall within the second threshold range. In this embodiment of this application, the following fifth manner may be further used from a perspective of the access network device, to control a phase deviation of uplink transmission between the first part and the second part in the first time period to be within the first threshold range, and/or control a power deviation of uplink transmission between the first part and the second part in the first time period to fall within the second threshold range.

In the fifth manner, the access network device determines not to perform at least one of the following in a first time period:

sending a sixth message to the terminal device, where the sixth message is used to dynamically schedule a first downlink resource, and the first downlink resource is used to send downlink information;

sending downlink information to the terminal device by using a dynamically scheduled first downlink resource;

sending downlink information to the terminal device by using a periodic or semi-persistent second downlink resource; or sending a seventh message to the terminal device, where the seventh message is used to dynamically schedule a second uplink resource, and the second uplink resource is used to receive second uplink information.

The first uplink resource is used to receive first uplink information. The first uplink information and the second uplink information are information about different types of uplink physical layer channels or different types of uplink physical layer signals, or the first uplink information and the second uplink information belong to different power control processes.

In this embodiment, the access network device may not dynamically schedule the first downlink resource in the first time period, to avoid a phase jump of uplink transmission of the terminal device. Alternatively, the access network device may not send the downlink information to the terminal device by using the periodic or semi-persistent second downlink resource in the first time period, to avoid a phase jump of uplink transmission of the terminal device. Alternatively, the access network device may not dynamically schedule another uplink resource other than the first uplink resource in the first time period, to avoid a phase jump of uplink transmission of the terminal device.

The foregoing describes in detail the uplink transmission method according to embodiments of this application, and the following describes a communication apparatus in embodiments of this application.

Embodiments of this application describe in detail a schematic structure of the communication apparatus.

Figure 9:
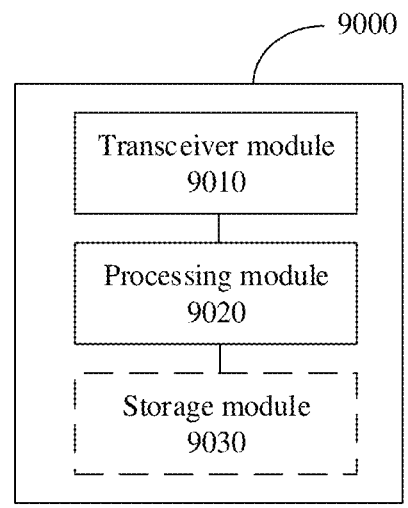
FIG. 9 is a schematic diagram of a communication apparatus 9000 according to an embodiment of this application.

In an example, FIG. 9 is a schematic block diagram of a communication apparatus 9000 according to an embodiment of this application. The apparatus 9000 in this embodiment of this application may be the terminal device in the foregoing method embodiments, or may be one or more chips in a terminal device. The apparatus 9000 may be configured to perform some or all functions of the terminal device in the foregoing method embodiments. The apparatus 9000 may include a transceiver module 9010 and a processing module 9020. Optionally, the apparatus 9000 may further include a storage module 9030.

For example, the transceiver module 9010 may be configured to: receive the first message from the access network device in step 101 in the foregoing method embodiment, and perform the uplink transmission in step 102.

For example, the transceiver module 9010 may be configured to: receive the first message from the access network device in step 202 and at least one of the first information or the second information from the access network device in step 201 in the foregoing method embodiment, and perform the uplink transmission in step 204.

The processing module 9020 may be configured to perform step 203 in the foregoing method embodiment.

For example, the transceiver module 9010 may be configured to receive the second message from the access network device in step 301 in the foregoing method embodiment.

The processing module 9020 may be configured to perform step 302 in the foregoing method embodiment.

For example, the transceiver module 9010 may be configured to: receive the second message from the access network device in step 401 and the third message in step 402 in the foregoing method embodiment, and send the third uplink information in step 404.

The processing module 9020 may be configured to perform step 403 in the foregoing method embodiment.

For example, the transceiver module 9010 may be configured to: receive the second message from the access network device in step 501 in the foregoing method embodiment, and send the second uplink information in step 502.

Alternatively, the apparatus 9000 may be configured as a general-purpose processing system, which, for example, is generally referred to as a chip. The processing module 9020 may include one or more processors that provide a processing function. The transceiver module 9010 may be, for example, an input/output interface, a pin, or a circuit. The input/output interface may be configured to be responsible for information exchange between the chip system and the outside. For example, the input/output interface may output uplink data of the terminal device to another module other than the chip for processing. The processing module may execute computer-executable instructions stored in the storage module, to implement a function of the terminal device in the foregoing method embodiments. In an example, the storage module 9030 optionally included in the apparatus 9000 may be a storage unit in a chip, for example, a register or a cache. Alternatively, the storage module 9030 may be a storage unit that is in the terminal device and that is located outside the chip, for example, a read-only memory (ROM) or another type of static storage device that can store static information and instructions, or a random access memory (RAM).

Figure 10:
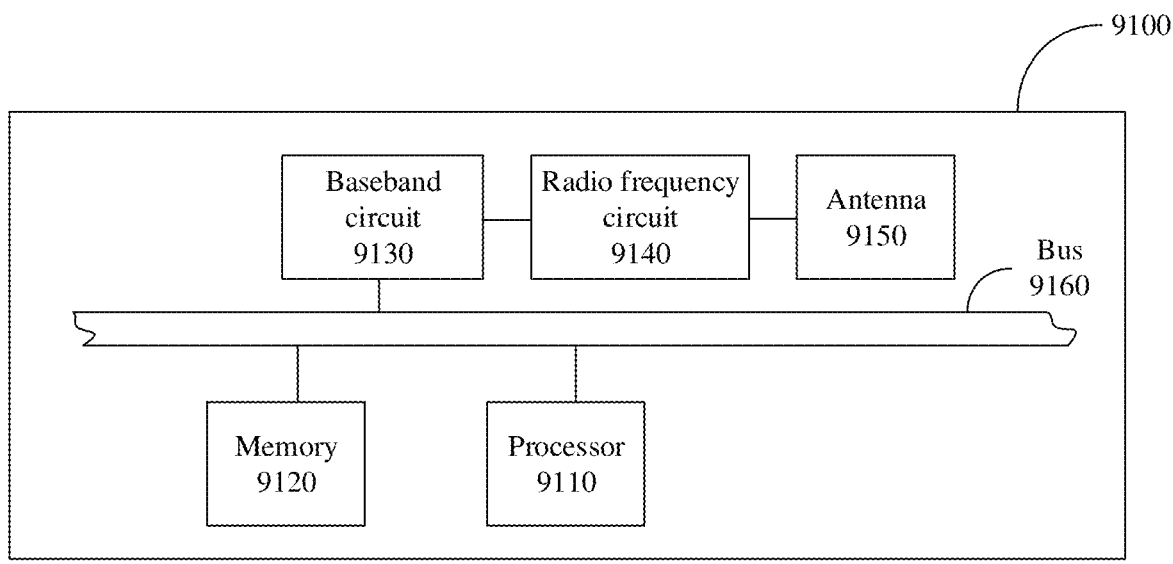
FIG. 10 is a schematic diagram of another communication apparatus 9100 according to an embodiment of this application.

In another example, FIG. 10 is a schematic block diagram of another communication apparatus 9100 according to an embodiment of this application. The apparatus 9100 in this embodiment of this application may be the terminal device in the foregoing method embodiments, and the apparatus 9100 may be configured to perform some or all functions of the terminal device in the foregoing method embodiments. The apparatus 9100 may include a processor 9110, a baseband circuit 9130, a radio frequency circuit 9140, and an antenna 9150. Optionally, the apparatus 9100 may further include a memory 9120. The processor 9110, the memory 9120, and the baseband circuit 9130 of the apparatus 9100 are coupled together through a bus 9160. In addition to a data bus, the bus system 9160 further includes a power bus, a control bus, and a status signal bus. However, for clear description, various types of buses are marked as the bus system 9160 in the figure. The baseband circuit 9130 is connected to the radio frequency circuit 9140, and the radio frequency circuit 9140 is connected to the antenna 9150.

The processor 9110 may be configured to: control the terminal device, and perform processing that is performed by the terminal device in the foregoing embodiments. The processor 9110 may perform processing processes related to the terminal device in the foregoing method embodiments and/or may be used for other processes of the technology described in this application, and may further run an operating system, manage the bus, and execute a program or instructions stored in the memory.

The baseband circuit 9130, the radio frequency circuit 9140, and the antenna 9150 may be configured to support information receiving and sending between the terminal device and the access network device in the foregoing embodiments, to support wireless communication between the terminal device and the access network device. In an example, the first message sent by the access network device is received by using the antenna 9150. The radio frequency circuit 9140 performs processing such as filtering, amplification, down-conversion, and digitization. Then the baseband circuit 9130 performs baseband processing such as decoding and protocol-based data decapsulation, and the processor 9110 performs processing to restore signaling information sent by the access network device. In still another example, uplink data of the terminal device may be processed by the processor 9110, and the baseband circuit 9130 performs baseband processing such as protocol-based encapsulation and encoding. Further, the radio frequency circuit 9140 performs radio frequency processing such as analog conversion, filtering, amplification, and up-conversion, and then transmits the uplink data by using the antenna 9150.

The memory 9120 may be configured to store program code and data of a station, and the memory 9120 may be the storage module 9030 in FIG. 9. It may be understood that the baseband circuit 9130, the radio frequency circuit 9140, and the antenna 9150 may be further configured to support communication between the terminal device and another network entity, for example, communication between the terminal device and a network element on a core network side. In FIG. 10, the memory 9120 is shown as separated from the processor 9110. However, a person skilled in the art easily understands that the memory 9120 or any part of the memory 9120 may be located outside the communication apparatus 9100. For example, the memory 9120 may include a transmission line and/or a computer product separated from a wireless node, and all these media may be accessed by the processor 9110 by using a bus interface 9160. Alternatively, the memory 9120 or any part of the memory 9120 may be integrated into the processor 9110, for example, may be a cache and/or a general-purpose register.

It may be understood that FIG. 10 shows merely a simplified design of the terminal device. For example, in an actual application, the terminal device may include any quantity of transmitters, receivers, processors, memories, and the like. All terminal devices that can implement this application fall within the protection scope of this application.

In a possible implementation, the communication apparatus may alternatively be implemented by using the following: one or more field programmable gate arrays (FPGAs), a programmable logic device (PLD), a controller, a state machine, gate logic, a discrete hardware component, any other proper circuit, or any combination of circuits that can perform various functions described in this application. In still another example, an embodiment of this application further provides a computer storage medium. The computer storage medium may store program instructions indicating any one of the foregoing methods, to enable a processor to execute the program instructions to implement the method and the function that are related to the terminal device in the foregoing method embodiments.

Figure 11:
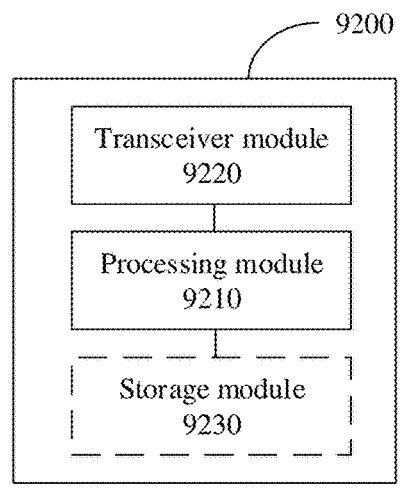
FIG. 11 is a schematic diagram of a communication apparatus 9200 according to an embodiment of this application.

Embodiments of this application describe in detail a schematic structure of a communication apparatus. In an example, FIG. 11 is a schematic block diagram of a communication apparatus 9200 according to an embodiment of this application. The apparatus 9200 in this embodiment of this application may be the access network device in the foregoing method embodiments, or may be one or more chips in the access network device. The apparatus 9200 may be configured to perform some or all functions of the access network device in the foregoing method embodiments. The apparatus 9200 may include a processing module 9210 and a transceiver module 9220. Optionally, the apparatus 9200 may further include a storage module 9230.

For example, the transceiver module 9220 may be used by the access network device to send the first message in step 101 in the foregoing method embodiment, and receive the uplink transmission in step 102.

For example, the transceiver module 9220 may be configured to: send the first message in step 202 and at least one of the first information or the second information in step 201 in the foregoing method embodiment, and receive the uplink transmission in step 204.

For example, the transceiver module 9220 may be configured to send the second message in step 301 in the foregoing method embodiment.

For example, the transceiver module 9220 may be configured to: send the second message in step 401 and the third message in step 402 in the foregoing method embodiment, and receive the third uplink information in step 404.

For example, the transceiver module 9220 may be configured to: send the second message in step 501 in the foregoing method embodiment, and receive the second uplink information in step 502.

Alternatively, the apparatus 9200 may be configured as a general-purpose processing system, which is generally referred to as a chip. The processing module 9210 may include one or more processors that provide a processing function. The transceiver module may be, for example, an input/output interface, a pin, or a circuit. The input/output interface may be responsible for information exchange between the chip system and the outside. For example, the input/output interface may output a master information block to another module outside the chip for processing. The one or more processors may execute computer-executable instructions stored in the storage module, to implement a function of the access network device in the foregoing method embodiments. In an example, the storage module 9230 optionally included in the apparatus 9200 may be a storage unit in a chip, for example, a register or a cache. Alternatively, the storage module 9230 may be a storage unit that is in the access network device and that is located outside the chip, for example, a read-only memory (ROM) or another type of static storage device that can store static information and instructions, or a random access memory (RAM).

Figure 12:
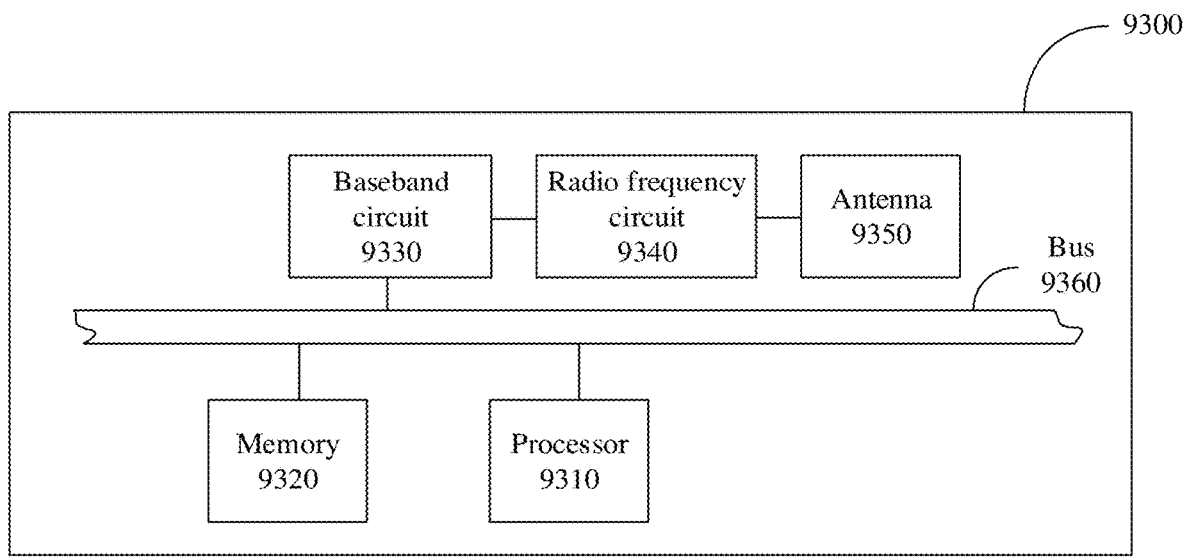
FIG. 12 is a schematic block diagram of another communication apparatus 9300 according to an embodiment of this application.

In another example, FIG. 12 is a schematic block diagram of another communication apparatus 9300 according to an embodiment of this application. The apparatus 9300 in this embodiment of this application may be the access network device in the foregoing method embodiments, and the apparatus 9300 may be configured to perform some or all functions of the access network device in the foregoing method embodiments. The apparatus 9300 may include a processor 9310, a baseband circuit 9330, a radio frequency circuit 9340, and an antenna 9350. Optionally, the apparatus 9300 may further include a memory 9320. The processor 9310, the memory 9320, and the baseband circuit 9330 of the apparatus 9300 are coupled together through a bus 9360. In addition to a data bus, the bus system 9360 further includes a power bus, a control bus, and a status signal bus. However, for clear description, various types of buses are marked as the bus system 9360 in the figure. The baseband circuit 9330 is connected to the radio frequency circuit 9340, and the radio frequency circuit 9340 is connected to the antenna 9350.

The processor 9310 may be configured to: control the access network device, and perform processing that is performed by the access network device in the foregoing embodiments. The processor 9310 may perform processing processes related to the access network device in the foregoing method embodiments and/or may be used for other processes of the technology described in this application, and may further run an operating system, manage the bus, and execute a program or instructions stored in the memory.

The baseband circuit 9330, the radio frequency circuit 9340, and the antenna 9350 may be configured to support information receiving and sending between the network device and the terminal device in the foregoing embodiments, to support wireless communication between the access network device and the terminal device. In an example, the first message of the access network device may be processed by the processor 5310, and the baseband circuit 9330 performs baseband processing such as protocol encapsulation and encoding on the first message. Further, the radio frequency circuit 9340 performs radio frequency processing such as analog conversion, filtering, amplification, and up-conversion, and then transmits the first message by using the antenna 9350. The memory 9320 may be configured to store program code and data of the access network device. The memory 9320 may be the storage module 9230 in FIG. 11. It may be understood that the baseband circuit 9330, the radio frequency circuit 9340, and the antenna 9350 may be further configured to support communication between the access network device and another network entity, for example, communication between the access network device and another network device.

It may be understood that FIG. 12 shows merely a simplified design of the access network device. For example, in an actual application, the access network device may include any quantity of transmitters, receivers, processors, memories, and the like, and all access network devices that can implement this application fall within the protection scope of embodiments of this application.

In a possible implementation, the communication apparatus may alternatively be implemented by using the following: one or more field programmable gate arrays (FPGAs), a programmable logic device (PLD), a controller, a state machine, gate logic, a discrete hardware component, any other proper circuit, or any combination of circuits that can perform various functions described in this application.

In still another example, an embodiment of this application further provides a computer storage medium. The computer storage medium may store program instructions indicating any one of the foregoing methods, to enable a processor to execute the program instructions to implement the method and the function that are related to the access network device in the foregoing method embodiments.

The processor in each of the apparatus 9100 and the apparatus 9300 may be a general-purpose processor, for example, a general-purpose central processing unit (CPU), a network processor (NP), or a microprocessor, or may be an application-specific integrated circuit (ASIC), or one or more integrated circuits configured to control program execution of the solutions in this application. Alternatively, the processor may be a digital signal processor (DSP), a field programmable gate array (FPGA) or another programmable logic device, a discrete gate or a transistor logic device, or a discrete hardware component. Alternatively, a controller/processor may be a combination of processors implementing a computing function, for example, a combination of one or more microprocessors, or a combination of a DSP and a microprocessor. The processor usually performs logical and arithmetic operations according to program instructions stored in the memory.

The memory in the apparatus 9100 and the apparatus 9300 may further store an operating system and another application program. Specifically, the program may include program code, and the program code includes computer operation instructions. More specifically, the memory may be a read-only memory (ROM), another type of static storage device that can store static information and instructions, a random access memory (RAM), another type of dynamic storage device that can store information and instructions, a disk memory, or the like. The memory may be a combination of the foregoing storage types. In addition, the computer-readable storage medium/memory may be located in the processor, may be located outside the processor, or may be distributed in a plurality of entities including the processor or a processing circuit. The computer-readable storage medium/memory may be specifically embodied in a computer program product. For example, the computer program product may include a computer-readable medium in a packaging material.

In the several embodiments provided in this application, it should be understood that the disclosed system, apparatus, and method may be implemented in other manners. For example, the foregoing apparatus embodiment is merely example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk), or the like.

What is claimed is:

1. An uplink transmission method, applied to a terminal device or a chip of the terminal device, comprising:
receiving a first message sent by an access network device, wherein the first message is used to configure a first uplink resource comprising at least a first part and a second part in a first time period; and
performing uplink transmission on the first uplink resource by controlling the uplink transmission between the first part and the second part to maintain phase continuity of the uplink transmission in the first time period,
wherein
the first time period is a duration between a start time and an end time of the first uplink resource in a first time length, or a duration between a start time and an end time of the first uplink resource in a first transmit opportunity, and at least one of a time domain interval between the first part and the second part is greater than 0 time domain resource units, or the first part and the second part are located in different slots.

2. The uplink transmission method according to claim 1, wherein the first time length is preset, or the method further comprises:

receiving first information sent by the access network device, wherein the first information indicates the first time length.

3. The uplink transmission method according to claim 2, further comprising:

receiving second information sent by the access network device, wherein the second information indicates a target channel to perform uplink transmission on the first uplink resource; and determining the first time length based on a time domain location of the first uplink resource and at least one of the first information or the second information.

4. The uplink transmission method according to claim 1, further comprising:

determining not to receive downlink information in the first time period.

5. The uplink transmission method according to claim 1, wherein the first uplink resource further comprises a third part in the first time period, and the third part is a time domain resource that does not carry uplink information.

6. The uplink transmission method according to claim 1, further comprising:

determining not to send uplink information of another uplink resource in the first time period.

7. An uplink transmission method, applied to a network device or a chip of the network device, comprising:

sending a first message to a terminal device, wherein the first message is used to configure a first uplink resource comprising at least a first part and a second part in a first time period; and performing uplink reception on the first uplink resource of an uplink transmission from the terminal device, wherein the uplink transmission between the first part and the second part is maintained phase continuity of the uplink transmission in the first time period, the first time period is a duration between a start time and an end time of the first uplink resource in a first time length, or a duration between a start time and an end time of the first uplink resource in a first transmit opportunity, and at least one of a time domain interval between the first part and the second part is greater than 0 time domain resource units, or the first part and the second part are located in different slots.

8. The uplink transmission method according to claim 7, wherein the first time length is preset, or the method further comprises:

sending first information to the terminal device, wherein the first information indicates the first time length.

9. The uplink transmission method according to claim 7, further comprising:

sending second information to the terminal device, wherein the second information indicates a target channel to perform uplink transmission on the first uplink resource.

10. The uplink transmission method according to claim 7, wherein the first uplink resource further comprises a third part in the first time period, and the third part is a time domain resource that does not carry uplink information.

11. The uplink transmission method according to claim 7, further comprising:

performing channel estimation of the second part based on a pilot signal of the first part; or performing channel estimation of the first part based on a pilot signal of the second part.

12. An apparatus, comprising:

at least one processor; and at least one memory having instructions stored thereon that, when executed by the at least one processor, cause the apparatus to:

receive a first message sent by an access network device, wherein the first message is used to configure a first uplink resource comprising at least a first part and a second part in a first time period; and perform uplink transmission on the first uplink resource, resource by controlling the uplink transmission between the first part and the second part to maintain phase continuity of the uplink transmission in the first time period, wherein the first time period is a duration between a start time and an end time of the first uplink resource in a first time length, or a duration between a start time and an end time of the first uplink resource in a first transmit opportunity, and at least one of a time domain interval between the first part and the second part is greater than 0 time domain resource units, or the first part and the second part are located in different slots.

13. The apparatus according to claim 12, wherein the first time length is preset, or the apparatus is further caused to:

receive first information sent by the access network device, wherein the first information indicates the first time length.

14. The apparatus according to claim 13, wherein the apparatus is further caused to:

receive second information sent by the access network device, wherein the second information indicates a target channel to perform uplink transmission on the first uplink resource; and determine the first time length based on a time domain location of the first uplink resource and at least one of the first information or the second information.

15. The apparatus according to claim 12, wherein the apparatus is further caused to:

determine not to receive downlink information in the first time period.

16. The apparatus according to claim 12, wherein the first uplink resource further comprises a third part in the first time period, and the third part is a time domain resource that does not carry uplink information.

17. The apparatus according to claim 12, wherein the apparatus is further caused to:

determine not to send uplink information of another uplink resource in the first time period.

18. An apparatus, comprising:
at least one processor; and
at least one memory having instructions stored thereon that, when executed by the at least one processor, cause the apparatus to:
send a first message to a terminal device, wherein the first message is used to configure a first uplink resource comprising at least a first part and a second part in a first time period; and
perform uplink reception on the first uplink resource of an uplink transmission from the terminal device,
wherein
the uplink transmission between the first part and the second part is maintained phase continuity of the uplink transmission in the first time period,
the first time period is a duration between a start time and an end time of the first uplink resource in a first time length, or a duration between a start time and an end time of the first uplink resource in a first transmit opportunity, and
at least one of a time domain interval between the first part and the second part is greater than O time domain resource units, or the first part and the second part are located in different slots.

19. The apparatus according to claim 18, wherein
the first time length is preset, or
the apparatus is further caused to:
send first information to the terminal device, wherein the first information indicates the first time length.

20. The apparatus according to claim 18, wherein the apparatus is further caused to:
send second information to the terminal device, wherein the second information indicates a target channel to perform uplink transmission on the first uplink resource.

21. The apparatus according to claim 18, wherein
the first uplink resource further comprises a third part in the first time period, and
the third part is a time domain resource that does not carry uplink information.

22. The apparatus according to claim 18, wherein the apparatus is further caused to:
perform channel estimation of the second part based on a pilot signal of the first part; or
perform channel estimation of the first part based on a pilot signal of the second part.

* * * * *